H. A. TUTTLE.
REVERSING GEARING.
APPLICATION FILED JAN. 24, 1917.

1,246,503.

Patented Nov. 13, 1917.

Inventor.
Henry A. Tuttle
by B. J. Noyes
Atty.

UNITED STATES PATENT OFFICE.

HENRY A. TUTTLE, OF TAUNTON, MASSACHUSETTS.

REVERSING-GEARING.

1,246,503.  Specification of Letters Patent.  Patented Nov. 13, 1917.

Application filed January 24, 1917. Serial No. 144,283.

*To all whom it may concern:*

Be it known that I, HENRY A. TUTTLE, a citizen of the United States, residing at Taunton, in the county of Bristol and State of Massachusetts, have invented an Improvement in Reversing-Gearing, of which the following is a specification.

This invention relates to reversing gearing for connecting a continuously-rotating shaft with another shaft, whereby the latter may be driven forward or backward or may remain idle. In gearing of this type it is customary to employ a clutch - mechanism for connecting the driving-shaft with the driven-shaft for forward drive, and to employ suitable gearing, usually of the planetary type, which engages the driving-shaft and driven-shaft for reverse drive, and to provide for holding the clutch - mechanism disengaged and for adjusting or releasing the planetary gearing, whereby the drive-shaft may rotate freely, while the driven-shaft remains idle. The clutch-mechanism is sometimes adapted for operation by suitable actuating-mechanism, and the power transmitted through some element or elements which are movable axially for this purpose.

As for instance, sometimes the inclosing-case for the reverse drive gearing and parts connected therewith are movable axially and utilized to effect operation of the clutch-mechanism.

There are objections to making the inclosing-case of the reverse drive mechanism and parts connected therewith movable axially, merely for the sake of transmitting the power from the actuating-means, and in another application, Serial No. 144282, filed by me Jan. 24, 1917, a construction is shown wherein only one of the components of the reverse drive gearing is axially movable, but certain objections apply even to this structure.

One of the objects of this invention is the provision of means for operating the clutch-mechanism, which is extended through the reverse drive gearing, and adapted for axial movement by the actuating - means independently of the reverse drive gearing, or any of its components, such means consisting of thrust - pins, or some equivalent power-transmitting means.

Another object of the invention is the provision of a set of axially movable thrust-pins arranged for engagement with the clutch - components, and another set of thrust-pins, or equivalent means, which are or may be formed as integral elements, and extended through the reverse drive gearing and adapted for axial movement by the actuating-means.

Figure 1:
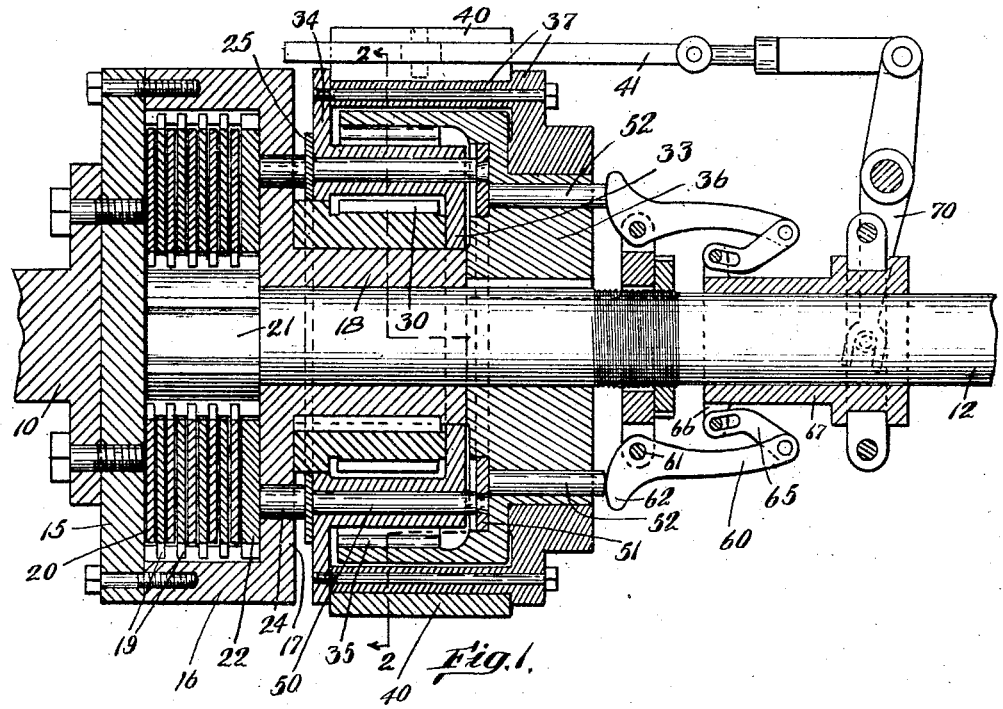
Figure 1 is a longitudinal vertical section of a reversing gearing embodying this invention.
Figure 2:
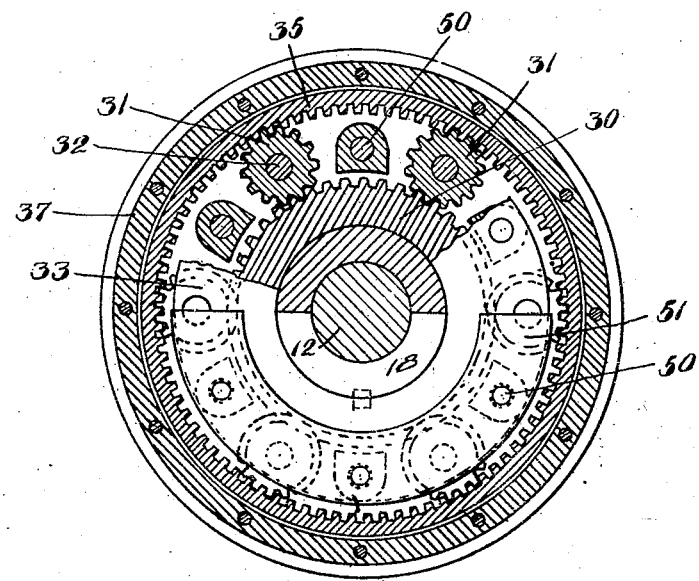
Fig. 2 is a transverse section taken on the dotted line 2—2 of Fig. 1.

In the reversing gearing here shown, as illustrating one embodiment of my invention, 10 represents the engine-shaft or drive-shaft and 12 the propeller-shaft or driven-shaft. A clutch-case is herein provided for and forms a part of the clutch-mechanism, which is rigidly secured to the drive-shaft and is extended over upon the driven-shaft, it comprising a circular end-wall 15, bolted to a flange on the drive-shaft, and a cylindrical side wall and circular end-wall 16, 17, secured to the end wall 15, and a tubular cylindrical hub or extension 18, which extends over and is supported on the driven-shaft. Within this clutch-case a series of annular clutch - plates 19 and 20 are arranged, which are alternately disposed relative to each other, some having their outer peripheries formed with projections which engage recesses in the interior of the side-wall 16 of said case, and others having their inner peripheries formed with projections which engage recesses in a hub 21 which may be secured to or formed on the driven-shaft. The clutch-mechanism here shown and described is adapted to provide a direct connection between the drive - shaft and driven-shaft, when the components thereof are moved axially into engagement with each other and with the end-wall 15. The inner or endmost clutch - plate 22 of the series is arranged next the inner wall 17 of the case, and thrust-pins 24 are extended through said inner wall for engagement with said clutch-plate 22, thereby to move said plate axially and cause engagement of the several plates of the clutch. There may be several such thrust-pins 24 employed. These thrust - pins normally project from the wall 17, and are engaged by an annular wear-plate 25, and pressure upon said wear-plate acts to move all of the thrust-pins axially to operate the clutch-mechanism.

The reverse drive gearing here shown consists of a spur gear 30, rigidly secured to the hub 18 of the clutch-case, and hence with the drive-shaft, several pinions 31 engaging said spur gear, mounted on rods 32, having their ends supported by the walls 33 and 34, respectively, of a pinion carrier, and an internal gear 35 engaging said pinions having its hub 36, arranged on and splined to the driven-shaft, and an inclosing-case 37 is rigidly secured at one end to the wall 33 of the pinion-carrier and extends over the internal gear and onto the hub thereof. In this form of reverse drive gearing, none of the components are movable axially.

A braking element 40 embraces the inclosing-case which is adapted for operation by suitable means, not shown, connected with a bar 41 by which said case and associated parts may be restrained from rotation, thereby to cause reverse drive of the driven-shaft. When unrestrained, the driven-shaft is free to remain idle, or to be rotated forward, according to whether the clutch-mechanism is engaged or disengaged. The reverse gearing thus described is a form to which my present invention is especially applicable, although it will be understood that it is also applicable to other forms of reverse gearing, but more particularly to those having the reverse drive gearing arranged between the clutch-mechanism and the actuating-means.

Herein a plurality of separate but integral elements are extended through the reverse drive gearing, one of the ends of said elements engaging the wear-plate 25, and the other ends terminating adjacent a suitable actuating-means to be moved axially by said means for the purpose of operating the clutch-mechanism through the wear-plate 25 and thrust-pins 24. As here shown, said elements each consist of a long thrust-pin 50 arranged to be supported by the pinion carrier and extended therethrough, and an annular plate 51 arranged in the space between the pinion carrier and the crown of the internal gear to which said pins 50 are rigidly connected, and thrust-pins 52 supported by the hub of the internal gear and extended therethrough, the inner ends of said pins 52 engaging said annular plate 51, and the outer ends of said pins projecting beyond the end of the hub into position to be engaged by suitable actuating-means employed for moving them axially. Axial movement of the thrust-pins 52 in turn moves the annular plate 51 and thrust-pins 50 and annular plate 25 and thrust-pins 24, so that the clutch is operated by the axially movable power-transmitting means, such as thrust-pins extended through the reverse drive gearing.

It will be observed that the thrust-pins 24 are revoluble in an orbit with the driving-shaft, and that the other thrust-pins are revoluble in an orbit with the driven-shaft, and hence the desirability of providing the wear-plate 25. Furthermore, it will be noted that on account of the hub of the internal gear being of lesser diameter than the diameter of the pinion carrier that the thrust-pins 52 are arranged in a circular series of lesser diameter than the diameter of the circularly-arranged series of thrust-pins 52, and hence the provision of the annular-plate 51 is desirable.

The actuating-means for axially moving the thrust-pins 52 may be of any of the many different types, but, as here shown, consists of levers 60, pivoted at 61, to an adjustable support and having projecting end-portions 62, adapted for engagement with the ends of the pins which project from the hub of the internal gear, said levers being pivotally connected at their other ends to angularly form slotted links 65, arranged on ears 66, on a slidable sleeve 67, mounted on the driven-shaft, and having an actuating-lever 70 connected with it by which it may be moved longitudinally on the shaft to operate said levers. Said actuating-member 70 is also connected with the bar 41 of the brake-mechanism for the reverse drive gearing, so that it may be employed to operate both the clutch-mechanism and the reverse drive gearing.

In this connection it may be stated that said slidable sleeve normally occupies a middle or predetermined position on the driven-shaft when the drive-shaft is rotating freely and the driven-shaft is idle, and it is movable in one direction from normal to operate the clutch-mechanism for forward drive and in the other direction from normal to operate the brake-mechanism for reverse drive.

I claim:—

1. In a reversing gearing, the combination of a driving-shaft, a driven-shaft, clutch-mechanism for connecting said shafts for forward drive, gearing connecting said shafts for reverse drive including a spur gear, pinions, a carrier for the pinions, and an internal gear, axially movable thrust-pins to operate the clutch-mechanism, which are extended through the pinion-carrier and internal gear, and actuating-means arranged for engagement with the pins which extend through the internal gear, to move said pins axially to operate the clutch-mechanism.

2. In a reversing gearing, the combination of a driving-shaft, a driven-shaft, clutch-mechanism for connecting said shafts for forward drive, gearing connecting said shafts for reverse drive including a spur gear, pinions, a carrier for the pinions, and an internal gear, means to operate the clutch-mechanism including axially movable integral elements extended through the pinion-carrier and internal gear, and actuating-means to move said elements axially.

3. In a reversing gearing, the combination of a driving-shaft, a driven-shaft, clutch-mechanism for connecting said shafts for forward drive, gearing connecting said shafts for reverse drive including a spur gear, pinions, a carrier for the pinions, and an internal gear, means to operate the clutch-mechanism including axially movable pins extended through the pinion-carrier, and axially movable pins extended through the internal gear, and means connecting said pins together, and actuating-means for moving said pins.

4. In a reversing gearing, the combination of a driving-shaft, a driven-shaft, clutch-mechanism for connecting said shafts for forward drive, gearing connecting said shafts for reverse drive, means to operate the clutch-mechanism including axially movable thrust elements extended through the reverse drive gearing, and actuating-means for moving said elements axially.

5. In a reversing gearing, the combination of a driving-shaft, a driven-shaft, clutch-mechanism for connecting such shafts for forward drive, gearing connected with said shafts for reverse drive, controlling-means for said reverse drive gearing, means to operate the clutch-mechanism including axially movable thrust elements extended through the reverse drive gearing and actuating-means for moving said elements axially which is connected with the controlling-means for the reverse drive gearing.

6. In a reversing gearing, the combination of a driving-shaft, a driven-shaft, clutch-mechanism for connecting said shafts for forward drive, gearing connecting said shafts for reverse drive, actuating-means for the clutch-mechanism and reverse drive gearing, and power-transmitting means interposed between said actuating-means and clutch-mechanism and extended through the reverse drive gearing.

7. In a reversing gearing, the combination of a driving-shaft, a driven-shaft, clutch-mechanism for connecting said shafts for forward drive, gearing connecting said shafts for reverse drive, actuating-means for the clutch-mechanism and reverse drive gearing, and thrust-pins interposed between said actuating-means and clutch-mechanism and extended through the reverse drive gearing.

8. In a reversing gearing, the combination of a driving-shaft, a driven-shaft, clutch-mechanism for connecting said shafts for forward drive, gearing connected with said shafts for reverse drive, actuating-means for the clutch-mechanism and axially movable thrust elements interposed between said actuating-means and clutch-mechanism, and extended through the reverse drive gearing.

9. In a reversing gearing, the combination of a driving-shaft, a driven-shaft, clutch-mechanism for connecting said shafts for forward drive, gearing connecting said shafts for reverse drive, means to operate the clutch-mechanism including axially movable elements extended through two of the components of the reverse drive gearing, being thereby accessible at the outside thereof, and actuating-means adapted to move said elements axially.

10. In a reversing gearing, the combination of a driving-shaft, a driven-shaft, clutch-mechanism for connecting said shafts for forward drive, gearing connecting said shafts for reverse drive, thrust-pins engaging one of the clutch-components, a wear-ring engaging said pins, and other longitudinally movable thrust-pins engaging said wear-ring and extended through the reverse drive gearing, and actuating-means for moving the thrust-pins axially.

11. In a reversing gearing, the combination of a driving-shaft, a driven-shaft, clutch-mechanism for directly connecting said shafts for forward drive, gearing connecting said shafts for reverse drive, axially movable thrust-pins for moving the clutch-components into engagement with each other, said pins being extended axially through the reverse drive gearing, and actuating-means for moving said pins axially to operate the clutch-mechanism, said reverse drive gearing being arranged between the clutch-mechanism and the actuating-means.

12. In a reversing gearing, the combination of a driving-shaft, a driven-shaft, clutch-mechanism for directly connecting said shafts for forward drive, an inclosing-case therefor, gearing connecting said shafts for reverse drive, two sets of axially movable thrust-elements for moving the clutch-components, one set being extended through the wall of the inclosing-case for the clutch-components, and the other set being extended through the reverse drive gearing, a wear-ring interposed between the two sets of thrust-pins, and actuating-means for moving said thrust elements to effect operation of the clutch-mechanism.

13. In a reversing gearing, the combination of a driving-shaft, a driven-shaft, clutch-mechanism for connecting said shafts for forward drive, planetary gearing connecting said shafts for reverse drive, including a pinion-carrier and internal gear, means to operate the clutch-mechanism including axially movable thrust-pins, which are extended through the pinion-carrier and internal gear of the planetary gearing, the ends of said pins projecting from said internal gear, and actuating-means arranged for engaging the projecting ends of said pins.

14. In a reversing gearing, the combination of a driving-shaft, a driven-shaft, clutch-mechanism for connecting said shafts for forward drive, gearing connecting said shafts for reverse drive, two sets of axially movable thrust elements, as pins, one set being associated with the clutch and rotatable with the driving-shaft, and the other set being extended through the reverse drive gearing and rotatable with the driven-shaft, a wear-plate interposed between said sets of thrust elements, and actuating-means for engaging the set of thrust elements which extends through the reverse drive gearing.

In testimony whereof, I have signed my name to this specification, in the presence of two subscribing witnesses.

HENRY A. TUTTLE.

Witnesses:
FREDERICK C. BURBANK,
ALFRED H. HENSHALL.

Copies of this patent may be obtained for five cents each, by addressing the "Commissioner of Patents, Washington, D. C."